United States Patent [19]
Johnson et al.

[11] Patent Number: 6,080,906
[45] Date of Patent: *Jun. 27, 2000

[54] DEMILITARIZATION OF CHEMICAL MUNITIONS

[75] Inventors: Russell Ward Johnson, Elmhurst; Francis Stephen Lupton, Evanston, both of Ill.; Brent F. De Feo, Sparta, N.J.; Jeffrey Chang, Vernon Hills, Ill.

[73] Assignee: AlliedSignal, Inc., Morristown, N.J.

[ * ] Notice: This patent is subject to a terminal disclaimer.

[21] Appl. No.: 09/152,431

[22] Filed: Sep. 14, 1998

Related U.S. Application Data

[60] Provisional application No. 60/059,279, Sep. 18, 1997.

[51] Int. Cl.[7] ........................................... A62D 3/00
[52] U.S. Cl. .......................... 588/200; 588/202; 588/203; 435/262.5
[58] Field of Search ..................................... 588/202, 203, 588/200; 435/262.5

[56] References Cited

U.S. PATENT DOCUMENTS

| | | | |
|---|---|---|---|
| 1,492,924 | 5/1924 | Knight | 60/253 |
| 3,440,096 | 4/1969 | Scott | 60/253 |
| 4,909,947 | 3/1990 | Johnson et al. | 210/737 |
| 5,250,161 | 10/1993 | Chin et al. | 204/131 |
| 5,370,845 | 12/1994 | Miller et al. | 422/186.3 |
| 5,437,853 | 8/1995 | Johnson et al. | 423/352 |
| 5,498,401 | 3/1996 | Johnson et al. | 423/352 |
| 5,505,841 | 4/1996 | Pirbazari et al. | 210/90 |
| 5,516,971 | 5/1996 | Hurley | 588/203 |
| 5,524,545 | 6/1996 | Miller et al. | 102/293 |
| 5,530,175 | 6/1996 | Johnson et al. | 588/203 |
| 5,584,071 | 12/1996 | Kalyon et al. | 588/200 |
| 5,714,128 | 2/1998 | Ritter | 422/121 |
| 5,730,765 | 3/1998 | Henry et al. | 588/270 |
| 5,737,709 | 4/1998 | Getty et al. | 588/202 |
| 5,779,996 | 7/1998 | Stormo | 422/227 |
| 5,781,868 | 7/1998 | Miller et al. | 588/200 |
| 5,836,718 | 11/1998 | Price | 405/128 |
| 5,837,149 | 11/1998 | Ross et al. | 210/759 |
| 5,861,090 | 1/1999 | Clarke et al. | 205/688 |
| 6,017,750 | 1/2000 | Harvey et al. | 435/262.5 |

OTHER PUBLICATIONS

National Academy Press, Alternative Technologies for the Destruction of Chemical Agents and Munitions, p56, 66, 110–116, 126, 134–135, 146–149, 1993.

*Primary Examiner*—Steven P. Griffin
*Assistant Examiner*—Elin Warn
*Attorney, Agent, or Firm*—Colleen D. Szuch

[57] ABSTRACT

A chemical munitions destruction system subjects the chemical agent and energetic materials to a series of treatment processes until a preselected level of destruction is achieved. The treatment processes include chemical neutralization and processing of both the chemical and energetic agents, biological treatment of the aqueous waste streams and catalytic oxidation of the air exhaust streams. In certain cases, the energetic agent and/or the propellant components of the munitions are converted to valuable chemicals by means of catalytic hydrotreating.

19 Claims, 2 Drawing Sheets

Test Conditions: 3 Hours, 300 psig

DEMILITARIZATION OF CHEMICAL MUNITIONS

CROSS-REFERENCE TO RELATED APPLICATIONS

This application claims the benefit of U.S. Provisional Application No. 60/059,279, filed Sep. 18, 1997.

BACKGROUND OF THE INVENTION

1. Field of the Invention

This invention relates to a system for destruction of chemical munitions; and, more particularly, to a system in which the disassembly of the munitions and the processing of the agent and energetic are effected through a series of treatment processes until the desired level of destruction is achieved.

2. Description of the Prior Art

The destruction of chemical munitions is a major international concern. These weapons are now outlawed by international treaties and their safe disposal has been mandated. Disposal of chemical weapons is conventionally effected by means of incineration. Although incineration represents a technically feasible approach to the destruction of these materials it is not acceptable to the many State and local governments nor to the communities surrounding the stockpile sites. The major concerns of these groups are the perceived hazards associated with air emissions from incinerators. There is a great desire on the part of all the stakeholders, government and citizen, of the chemical munitions demilitarization process to find cost efficient alternative technologies to the baseline incineration that are both safe and effective for destruction of these weapons.

SUMMARY OF THE INVENTION

The present invention provides a munitions destruction system that destroys the agents and energetic materials contained in chemical munitions. Generally stated, the system provides for processing of the agent and energetic through a series of treatment processes until the desired level of destruction is achieved. The treatment process comprises chemical neutralization and processing of both the chemical and energetic agents, biological treatment and, optionally, UV/peroxide chemical oxidation of the aqueous wastestreams, and catalytic oxidation of the air exhaust streams. In certain cases, the energetic and/or the propellant components of the munitions can be converted to valuable chemicals by means of catalytic hydrotreating.

BRIEF DESCRIPTION OF THE DRAWING

The invention will be more fully understood and further advantages will become apparent when reference is had to the following detailed description and the accompanying drawing in which.

DESCRIPTION OF THE PREFERRED EMBODIMENTS

Chemical agents which can be treated in accordance with the present invention are those highly toxic chemicals stockpiled for use in warfare. Examples of these chemical agents include, but are not limited to: Nerve agents such as GA (Tabun), GB (Sarin), GD (Soman), and VX; and Blister agents such as HD (distilled mustard), H, HT, nitrogen mustards (HN-1, HN-2, HN-3), and Lewisites (1, 2, and 3).

Energetic materials which can be treated in accordance with the present invention include those chemicals which are used for explosive or propellant purposes. Such energetic materials include, but are not limited to: TNT, RDX, HMX, Tetryl, Lead Azide, nitrocellulose, nitroglycerine, triacetin, dimethyl phthalate, lead stearate, 2-nitrodiphenylamine, and combination energetic materials, including Tetrytol, Comp B and B-4, Comp A-5, M-28 double-base propellant, and Propellants AX/S, NH, WIS1212 and CYH.

Figure 1:
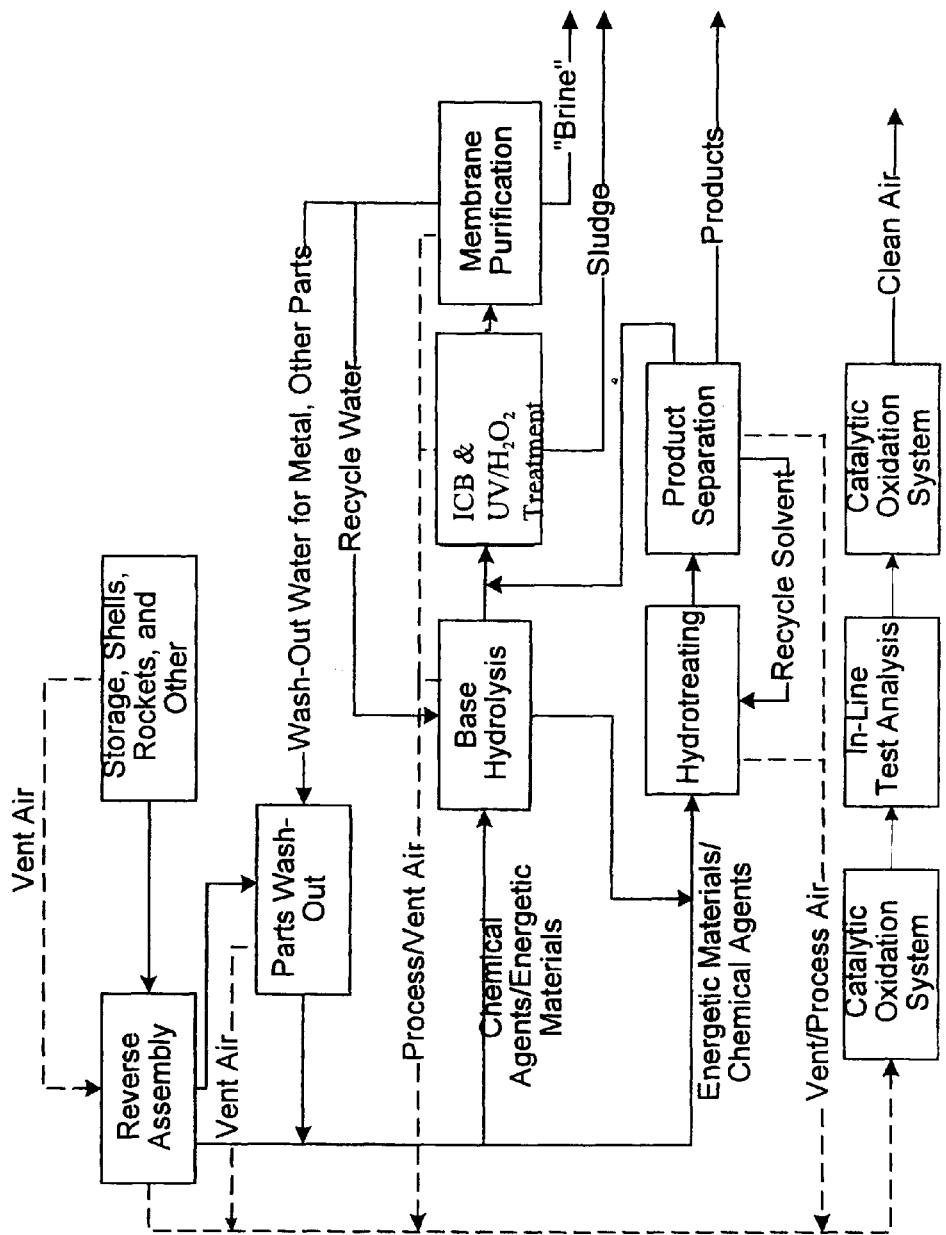
FIG. 1 is a process flow diagram of a chemical munitions disposal system utilizing a disassembly process, chemical neutralization and processing of both the chemical and energetic agents, biological and UV/Peroxide treatment of the aqueous wastestreams, and catalytic oxidation of the air exhaust streams.

Referring to FIG. 1 of the drawings, a chemical agent is recovered from chemical munitions by means of a reverse assembly process using a punch and drain process for removal of the agent and a water jet cutting process to remove energetics and propellant. The recovered chemical agent is subjected to base hydrolysis at a temperature ranging from about 60° C. to about 150° C., and preferably from about 80° C. to about 100° C. Base may be added during hydrolysis to catalyze the neutralization or may be added following neutralization to adjust pH to a value between pH 6 and pH 9, and preferably between pH 7 and pH 8, depending upon the chemical agent being processed. Suitable bases include but are not limited to: sodium hydroxide, potassium hydroxide, lithiumhydroxide, calcium oxides and hydroxides, magnesium hydroxide, and aqueous ammonia. The neutralized agent hydrolysis can be pretreated using suitable technologies which include but are not limited to those selected from the group consisting of lime precipitation, ion exchange, sulfide precipitation, and oxidative precipitation such as the Fenton's reaction by ferrous sulfate and peroxide to remove metals from the hydrolysate. These pretreatment technologies are well suited for removal of metals which include but are not limited to those selected from the group consisting of arsenic, lead, mercury, chromium, zinc, copper and cadmium. The neutralized agent hydrolysate is diluted with recycle water from the end of the process and is fed to an immobilized cell bioreactor (ICB) system. The ICB system degrades and removes the organophosphate and organosulfur compounds produced during hydrolysis of the chemical agents. The ICB system also degrades some of the volatile chlorinated organic compounds (VOCs) including chlorinated VOCs present in the hydrolysate. The remaining VOCs are stripped from the bioreactor and destroyed in a catalytic oxidation system on the exhaust air line of the bioreactor vessel.

Recovered energetic materials are subjected to a base hydrolysis process. Hydrolysis is carried out in the presence of base at a temperature of ranging from about 60° C. to about 150° C., and preferably from about 80° C. to about 100° C. The neutralized energetics will go to the same bioreactor system as used for the agent hydrolysate destruction. Whereas the agent hydrolysate is rich in organophosphate and organosulfur compounds but lacks nitrogen and in some cases organic substrates, the energetics hydrolysate is rich in nitrogen and organic substrates but lacks phosphorous and sulfur nutrients. The combination of both agent and energetics hydrolysate creates an ideal matrix for complete biodegradation of the constituents.

Optionally, If the energetic materials can be converted to valuable chemicals, the recovered energetics will be sent to a catalytic hydrotreating process. The burster and/or the propellant components of the munitions are readily converted to these valuable chemicals by means of catalytic hydrotreating. The energetics are dissolved in a suitable solvent and reduced in the catalytic hydrotreating reactor. The valuable chemical products are separated from the solvent by means of distillation or other separation technology and the solvent is recycled to the front of the process.

The effluent stream from the bioreactor system is first polished with UV/Peroxide oxidation to remove residual organics such as chlorinated organics, organophosphate and organosulfur compounds and is then sent to a water purification system that uses either a reverse osmosis (RO) membrane system or an evaporator system to recover clean water for recycling to the parts washout, base hydrolysis or bioreactor dilution water. The brine or salt cake produced from this process is tested and then disposed of in accordance with all local, state and federal regulations.

The catalytic oxidation system treats the vent air from multiple sources, including the ICB system as well as the vent air from the reverse assembly and munitions storage areas. The catalytic oxidation system not only removes VOCs but will also remove any unhydrolyzed chemical agent that enters into the vent air from the punch and drain operation for agent removal in the reverse assembly area as well as from leaking munitions in the storage areas.

The chemical munitions disposal process described herein destroys chemical weapons using chemical neutralization and processing of both the chemical and energetic agents, biological treatment of the aqueous waste streams and catalytic oxidation of the air exhaust streams, as well as a catalytic hydrotreating and product recovery process to convert some energetic components to valuable chemical by-products.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

The following example is illustrative of the process for chemical neutralization of agent HD. HD from an agent holding tank is pumped along with hot water through a static mixer which disperses the agent in the water as droplets roughly 60 microns in diameter. The aqueous dispersion is pumped to a well-stirred 2,300 gallon Kynar-lined reactor partially filled with hot water (90° C.). The agent concentration in the reactor is tentatively designed to be approximately 4 wt pct. The agent feed rate is controlled to maintain an excess of water that prevents the formation of sulfonium salts that slow the completion of neutralization. and give rise to additional by-products. As the agent reacts with water, the neutralization reaction produces hydrochloric acid. which lowers the pH until the mixture is highly acidic (about pH 2). The reaction time in the neutralization vessel will be 1 hour. The neutralization reaction is exothermic, so that heat is removed via a recycle loop with a heat exchanger. After the 1 hour reaction time, 18% sodium hydroxide is added to bring the pH to pH 12. This neutralizes the acid and prevents any reformation of the agent. The neutralized hydrolysate is transferred to a 5,300 gallon storage tank. The residual agent present is <200 ppb. This represents a >99.9995% destruction efficiency.

EXAMPLE 2

The following example is illustrative of the neutralization process for Agent VX. The recovered agent is neutralized in a 650 gallon stirred neutralization reactor with both internal and external mixers, overhead off gas condensers, a reactor cooling jacket, and an external heat-exchanger system. The neutralization reactor is partially filled with 11% caustic and brought up to an operating temperature of 90° C. The VX is then slowly added in the internal recirculation loop just ahead of the static mixer. The mixture is heated for a period of six hours. The heat from the exothermic reaction is removed by the cooling jacket and the external cooling system. As liquid is added to the reactor vessel, the overhead gases are vented through the reflux condenser to condense water vapor and volatile organic compounds. The condensate is recycled to the reaction vessel. The hot hydrolysate is transferred to a storage tank where hypochlorite is added to reduce odor and make the hydrolysate more amenable to biological treatment. The residual agent present in the hydrolysate is <20 ppb. This represents a destruction efficiency of greater than 99.9999%.

The hydrolysis process for agent GB is very similar to that for agent VX.

EXAMPLE 3

The following example is illustrative of the neutralization process for energetic materials. Three (3) lb of explosive Comp B-3 (60% RDX40% TNT) is hydrolyzed in a 10 gallon glass lined vessel containing 3.8 gallons of 1.5 M NaOH. The solution is heated to a maximum temperature of 91° C. The reaction is allowed to proceed for 2 hours until no visible reaction is observed. Destruction of Comp-B was >95%. Reaction for an additional 2 hours produces a destruction efficiency of >99.99%.

EXAMPLE 4

The following example is illustrative of the biological treatment process for HD agent. Diluted HD Hydrolysate (1:10) had the following properties: thiodiglycol, 6,900 mg/L; COD, 15,000 mg/L. The efficacy of the AlliedSignal Immobilized Cell Bioreactor ICB to treat the thiodiglycol (TDG) and Chemical Oxygen Demand (COD) present in the diluted HD hydrolysate was evaluated in a small bench top glass reactor. A total of about 13.8 Liters (3.6 gallons) of diluted hydrolysate were treated in the bench top ICB vessel. The ICB vessels were operated at ambient temperature (20° C.–25° C.) at 1 atm. Diluted hydrolysate was added as both batch and continuous feed. The bench top bioreactors were aerated by means of a glass frit at the bottom of the bioreactors through which air was fed at between 100 and 200 ml/min. The glass reactor had a liquid volume of about 740 ml. The reactor was packed with about 680 ml of a mixed media packing consisting of ½ inch squares of carbon coated polyurethane foam and ½ inch polypropylene cylinders. The destruction efficiencies of COD and TDG were as follows:

| Mode of Operation | Hydraulic Residence Time (days) | COD Inlet (mg/L) | COD Outlet (mg/L) | TDG Inlet (mg/L) | TDG Outlet (mg/L) |
|---|---|---|---|---|---|
| Batch | 15 | 13,063 | 2,300 | 6,900 | ND |
| Batch | 7.5 | 14,913 | 1,995 | 6,900 | <1 |
| Batch | 3.7 | 15,280 | 2,412 | 6,900 | 38 |
| Batch | 2.5 | 15,860 | 5,408 | 6,900 | 2,678 |
| Contin. | 3.0 | 15,400 | 5,791 | 6,900 | 2,475 |
| Contin. | 6.0 | 15,400 | 2,850 | 6,900 | <1 |

| Mode of Operation | Hydraulic Residence Time (days) | % COD Removal | % TDG Removal |
|---|---|---|---|
| Batch | 15 | 82 | ND |
| Batch | 7.5 | 87 | >99.9 |
| Batch | 3.7 | 84 | 99.4 |
| Batch | 2.5 | 66 | 61 |
| Contin. | 3.0 | 62 | 64 |
| Contin. | 6.0 | 81 | >99.9 |

ND—Not Determined

EXAMPLE 5

The following example illustrates use of the biological treatment process to treat agent VX hydrolysate. The diluted VX Hydrolysate had the following properties: sulfate, 10 mg/L; COD, 12,500 mg/L. The Efficacy of the ICB to treat the organophosphorous, organosulfur and COD present in the diluted VX hydrolysate was evaluated in a small bench top glass reactor. A total of about 5.5 Liters (1.5 gallons) of diluted hydrolysate were treated in the bench top ICB vessel. The ICB vessels were operated at ambient temperature (20–25° C.) at 1 atm. Diluted hydrolysate was added as both batch and continuous feed. The bench top bioreactors were aerated by means of a glass frit at the bottom of the bioreactors through which air was feed at between 100 and 200 ml/min. The glass reactor had a liquid volume of about 740 ml. The reactor was packed with about 680 ml of a mixed media packing consisting of ½ inch squares of carbon coated polyurethane foam and ½ inch polypropylene cylinders.

The destruction efficiency of COD, organophosphorous and organosulfur in the ICB vessel at a 15 day HRT was as follows:

| Mode of Operation | % COD Removal | % Organo phosphorous removal | % Organo sulfur removal |
|---|---|---|---|
| Batch | 96 | 75 | 96 |

EXAMPLE 6

The following example illustrates the ability of the biological process combined with UV/peroxide oxidation as a polishing step to treat VX and GB hydrolysates combined with hydrolysates of energetic compounds such as Comp B. Combined agent and energetic hydrolysates were first subjected to biological treatment, The effluent from the bioreactor was then clarified by flocculation and settling. The clarified water was treated with UV/peroxide to remove residual organics. The destruction efficiency of organophosphorous as measured by total phosphonates was as follows:

|  | Feed | Clarified effluent from bioreactor | UV/H$_2$O$_2$ Oxidation |
|---|---|---|---|
| GB/Comp B | 76 | 17 | 1 |
| VX/Comp B | 117 | 39 | 2 |

EXAMPLE 7

Figure 2:
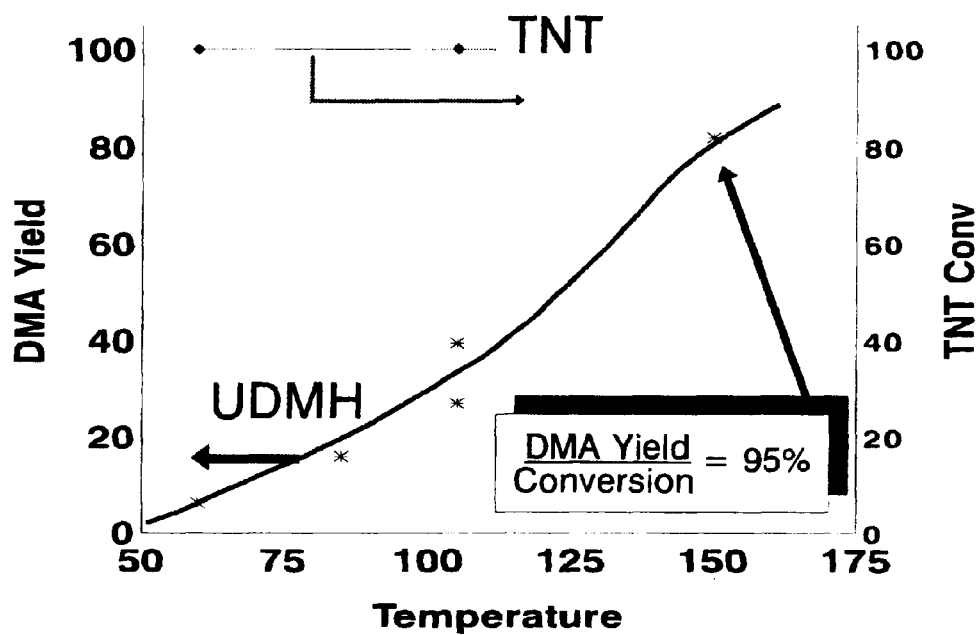
FIG. 2 is a conversion profile of energetic materials in a batch autoclave catalytic hydrotreater versus reaction temperature.

The following example illustrates use of the catalytic hydrotreating process to convert energetics to valuable chemicals:

The data shown in FIG. 2. was obtained from two energetic materials using a 450 mL batch autoclave reactor to show the information which can be derived from this analysis. This information was used to define the reaction temperature required to achieve high conversion. The data for TNT conversion was obtained at 60 and at 115° C. using a xylene as a solvent. As shown in FIG. 2, all of the TNT, a high explosive, was converted at 60° C. during the three hour reaction. The specific reaction products depend on the temperature; higher temperature favors toluene and methylcyclohexane while lower temperature favors triaminotoluene. The data for unsymmetrical dimethylhydrazine (UDMH), a propellant, shows that a higher reactor temperature is required to achieve a high conversion to demethylamine, which is a commercially valuable product.

The complete conversion of other energetic materials was carried out in the above batch autoclave at the conditions set forth in Table I below.

TABLE 1

| Energetic Material | Process Conditions |
|---|---|
| PETN | 5% in hexane/ethyl acetate 150° C., 400 psig |
| DDNP | 2.5% in acetone 150° C., 150 psig |
| RDX | 1% in acetone 100° C., 100 psig |
| HMX | 1% in acetone 100° C., 150 psig |
| Explosive D | 1–5% in water 80° C.–150° C., 50–150 psig |

EXAMPLE 8

The following example illustrates use of the catalytic oxidation process to destroy VOCs and agent in vent and/or bioreactor vent gas. Two compounds, bis(2-chloroethyl) sulfide (Mustard Gas), and Soman (GD, pinacolyl methyl phosphonofluoridate) are illustrated below. Quartz tubular reactors placed in heating furnaces are used for all tests. Monolithic honeycomb carrier catalysts are used in both cases. Catalysts are evaluated by flowing the test gas streams over the catalyst at a given temperature and monitoring the effluent stream.

| Mustard Gas (HD) | | | | | |
|---|---|---|---|---|---|
| 2.5 | 600 | 7.4 | 0.09 | 200 | >99.9 |
| 3.5 | 600 | 7.4 | 0.06 | 200 | >99.9 |
| 4.5 | 600 | 7.4 | 0.04 | 200 | 99.7 |

-continued

| | Soman (GD) | | | | |
|---|---|---|---|---|---|
| | GD | | | | |
| 2.5 | 600 | 7.4 | 0.09 | 150 | >99.995 |
| 3.5 | 600 | 7.4 | 0.06 | 150 | >99.996 |
| 4.5 | 600 | 7.4 | 0.04 | 200 | >99.97 |

Mustard Gas (HD)

Inlet and effluent HD levels are measured by sampling with bubblers and GC analysis to the destruction levels indicated above. Typical product effluents are set forth below:

| | |
|---|---|
| HCl | 100–150 |
| $SO_2$ | 120–180 |
| CO | 2–7 |

The remaining carbon balance was accounted for by $CO_2$.

Soman (GD)

Inlet and effluent GD levels are measured by sampling with bubblers and GC analysis to the destruction levels indicated above. Typical product effluents are:

| | |
|---|---|
| HF | 2–25 |
| CO | 2–7 |

The remaining carbon balance was accounted for by $CO_2$.

Having thus described the invention in rather full detail, it will be understood that such detail need not be strictly adhered to but that various changes and modifications may suggest themselves to one skilled in the art, all falling within the scope of the present invention as defined by subjoined claims.

What is claimed is:

1. A process for disposing of chemical munitions comprising a chemical agent and an energetic material, said process comprising the step of:
    biodegrading a mixture comprising a hydrolysate of a chemical agent and a hydrolysate of an energetic material to produce an effluent having a reduced concentration of organophosphate and organosulfur compounds relative to said mixture.

2. The process of claim 1, wherein the step of biodegrading said mixture is performed at least partially using an ICB reactor.

3. The process of claim 1, further comprising the steps of:
    removing said chemical agent and said energetic material from a munition; and
    hydrolyzing said chemical agent and at least a portion of said energetic material to form said hydrolysate of said chemical agent and said hydrolysate of said energetic material.

4. The process of claim 3, wherein the step of hydrolyzing is conducted at about 60 to about 150° C. and, optionally, in the presence of a base.

5. The process of claim 4, wherein the step of hydrolyzing is conducted in the presence of a base selected from the group consisting of sodium hydroxide, potassium hydroxide, lithium hydroxide, calcium oxides and hyrdoxides, magnesium hydroxide, aqueous ammonia and combinations of two or more thereof.

6. The process of claim 3, further comprising the step of:
    catalytically hydrotreating a portion of said energetic material in the presence of a precious metal catalyst and hydrogen gas under conditions sufficient to convert said energetic to a reaction product.

7. The process of claim 6, wherein the step of catalytically hydrotreating further comprises the steps of:
    (i) dissolving said energetic materials in a suitable solvent to create a solvent stream;
    (ii) reacting said solvent stream containing said energetic materials in a reaction vessel at a temperature of about 50 to about 600° C. and a pressure of about 1 to about 500 atm in the presence of hydrogen and a suitable reductive catalyst to create reaction products; and
    (iii) distilling said solvent stream to separate said reaction products therefrom.

8. The process of claim 7, wherein the step of hydrotreating is performed at about 100 to about 1000 psig and at about 50 to about 400° C.

9. The process of claim 1, further comprising:
    catalytically oxidizing gases vented during the disposal process to reduce the concentration of volatile organic compounds.

10. The process of claim 9, wherein the step of catalytically oxidizing also reduces the concentration of chemical agent gases and energetic gases.

11. The process of claim 9, wherein said gases comprise those vented from one or more sources selected from a biodegradation reactor, a reverse assembly area, and a munitions storage area.

12. The process of claim 9, wherein the step of said catalytically oxidatizing comprises the step of:
    treating vent air in a monolith catalytic oxidizer at a temperature ranging from about 200 to about 600° C.

13. The process of claim 1, wherein the step of biodegrading comprises one or more of the following steps:
    (i) regulating the pH of said mixture at about 6 to about 9;
    (ii) adding supplements to support microbial growth; and
    (iii) diluting said mixture to increase microbial growth.

14. The process of claim 13 wherein the pH of said mixture is regulated at about 7.

15. The process of claim 1, wherein further comprises the step of:
    polishing organophosphorous and organosulfur compounds in said effluent using an ultraviolet/peroxide oxidation system.

16. The process of claim 11, further comprising the step of:
    removing one or more metals from said mixture prior to biodegrading.

17. The process of claim 16, wherein the step of removing one or more metals is accomplished using a technology selected from the group consisting of oxidative precipitation, lime precipitation, ion exchange, and sulfide precipitation.

18. The process of claim 17, wherein said oxidative precipitation is carried out using Fenton's reaction with ferrous sulfate and peroxide.

19. The process of claim 16, wherein said metals include at least one member selected from the group consisting of arsenic, lead, mercury, chromium and cadmium.

* * * * *